June 5, 1945.　　　　L. D. OVERLAND　　　　2,377,364
STICK HOLDER
Filed Jan. 28, 1942
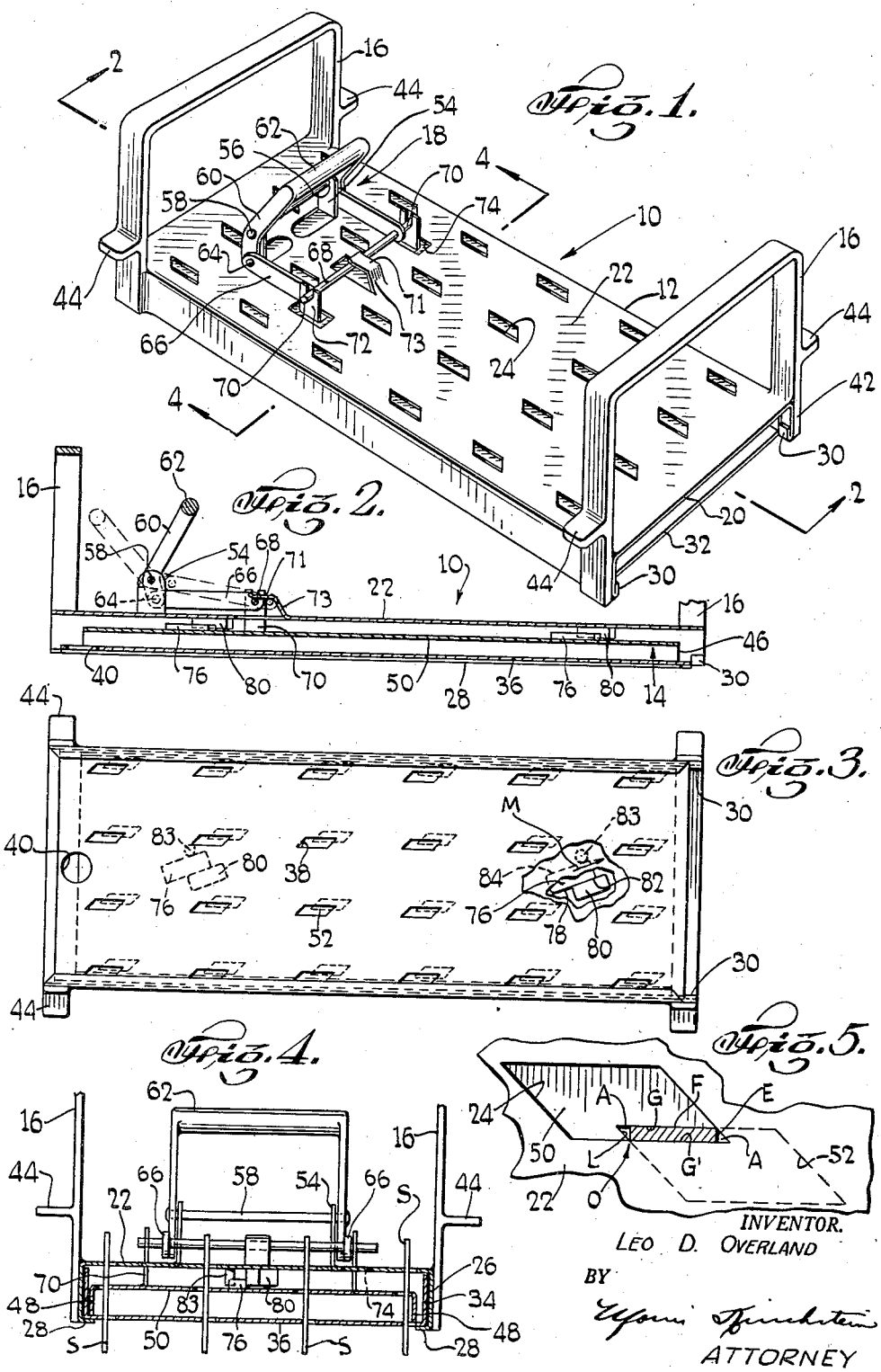
INVENTOR.
LEO D. OVERLAND
BY
[signature]
ATTORNEY Patented June 5, 1945

2,377,364

UNITED STATES PATENT OFFICE 2,377,364

STICK HOLDER

Leo D. Overland, Brooklyn, N. Y., assignor to Ice Cream Novelties, Inc., Brooklyn, N. Y., a corporation of New York Application January 28, 1942, Serial No. 428,533

12 Claims. (Cl. 294—87)

This invention relates to a device for releasably holding in preselected position a plurality of sticks which are used as handles for frozen confections.

These sticks are generally elongated and of a rectangular transverse section so that their longitudinal surfaces comprise two narrow edges and two wide faces.

It has been the practice, heretofore, to orient the sticks before gripping the same by the use of members which coacted with the narrow edges of the sticks. These orienting members subsequently gripped the sticks by engaging said edges. Due to the small bearing surfaces presented by the narrow edges, the sticks have been appreciably indented by the members and have worn down or eroded the members. This eroding action proceeds quite rapidly and after a relatively short time the members become so worn that they only loosely grip the sticks and often allow the sticks to drop after a confection bar has been frozen thereon.

It is an object of my invention to overcome the foregoing difficulties by providing a stick holder of the character described which grips the wide longitudinal faces of the sticks and thus enlarges the surface of engagement of the gripping members. By employing such a large gripping surface, the sticks are less noticeably mutilated and the gripping members have a much longer life.

It is another object of my invention to provide a stick holder of the character described which locates the sticks preliminarily to gripping the same on their wide faces by coaction between locating members and the narrow edges of the sticks.

A further object of my invention is to provide a stick holder of the character described in which there are employed three spaced gripping members which are completely and readily separable from each other so that the entire interior construction of the stick holder may be exposed for cleaning.

An additional object of my invention is to provide a stick holder of the character described having a stationary gripping member and a movable gripping member in which the movable gripping member is reciprocably translated in a direction angularly inclined to the wide faces of the sticks.

Still another object of my invention is to provide a stick holder of the character described which comprises relatively few and simple parts, which is rugged in construction, economical to manufacture, and simple and highly efficient to use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of this invention, Fig. 1 is a perspective view of a multiple stick holder embodying my invention, the manual actuating means being illustrated in unlocked position;

Fig. 2 is a sectional view thereof taken substantially along the line 2—2 of Fig. 1 and showing in dotted lines the locked position of the manual actuating means;

Fig. 3 is a bottom view thereof, the various elements being illustrated in locked position;

Fig. 4 is a sectional view thereof taken substantially along the line 4—4 of Fig. 1; and Fig. 5 is an enlarged fragmentary top plan view which is explanatory of the position of the gripping and location elements at the time that a stick is locked in the holder.

Referring now to the drawing, I have there shown a multiple stick holder 10 so constructed and arranged as to releasably grip a plurality of elongated flat sticks S (Fig. 4) of the type customarily employed in connection with frozen confections. In general, the stick holder comprises an elongated, hollow box-like member 12 within which is slidably disposed a movable gripping member 14. Said stick holder 10 also includes a pair of handles 16 for carrying same from place to place and manual actuating means 18 for shifting the movable gripping member 14.

The box 12 may be conveniently stamped or pressed from light gauge metal such as Monel metal or stainless steel and is preferably made in two sections so as to permit easy separation of the various elements of the stick holder for cleaning.

The upper box section 20 is of an inverted stubbed U-shape. The flat top 22 of said section which comprises the uppermost combined gripping and locating member is rectangular and is provided with a plurality of apertures 24. Said apertures are arranged relatively to each other in a manner which is determined by the type of frozen confection mold with which the stick holder 10 is to be employed. Ordinarily, the molds have the cavities thereof disposed in parallel rows, the cavities in each row also being registered along lines disposed at right angles to said rows. The apertures 24 are arranged in this manner. The sides 26 of the section 20 are vertically disposed and the free ends thereof inturned to provide a ledge 28, whose purpose will soon be apparent. Portions 30 of the ledges 28 adjacent one end of the holder 10 are folded back against the side walls 26.

Slidably received on the ledge 28 is a bottom section 32 which is of an erect stubbed U-shape. The side walls 34 of the section 32 slidingly engage the side walls 26 of the upper section 20. The bottom flat wall 36 of said section 32 which comprises the lowermost combined gripping and locating member is disposed parallel to the top flat wall 22 and rests upon the flanges 28. The operative position of the bottom wall in the holder 10 is determined by abutment of one end of the section 32 against stops formed by the inturned portions 30. The bottom wall 36 is also provided with a plurality of apertures 38 of a size, shape and orientation identical to the apertures 24. These apertures 38, when the bottom section 34 is abutted against the stops 30, are in exact vertical registration with the apertures 24. A finger hole 40 may be provided in the wall 36 to facilitate sliding of the bottom section 32 into or out of nesting engagement with the top section 20.

The handles 16 may be of an inverted U-shape with the ends 42 of the legs attached in any suitable manner, as for example welding to the exterior of the side walls 26 of the upper section 20. The handle legs may also be provided with a plurality of outwardly projecting coplanar extensions 44 which render the said stick holder 10 capable of use in conjunction with the dipping apparatus shown in my copending application for a Method and means for coating ice-cream bars and the like, Serial No. 428,534, filed January 28, 1942.

The movable gripping member 14 comprises another section 46 of an inverted stubbed U-shape which rests on the bottom wall 36. The side walls 48 of the intermediate section 46 are so dimensioned that the flat top wall 50 of said section which comprises the intermediate combined gripping and locating member is disposed substantially half-way between the flat walls 22 and 36. A set of apertures 52 exactly similar to the set of apertures 24 and 38 is provided in the wall 50.

All of the apertures 24, 38 and 52 are of such shape and dimensions that when the apertures 52 in the intermediate section are aligned with the apertures in the top and bottom walls 22 and 36, a stick S can freely pass therethrough. When the intermediate section 46 is moved in such a manner as to contract the effective opening O defined by the registered portions of three overlying apertures 24, 38 and 52, a point will finally be reached where the stick is gripped between the straight edge portion G (Fig. 5) of an intermediate aperture 52 and a pair of oppositely disposed straight edge portions G' of the top and bottom apertures 24 and 38. The dimensions of the apertures 24, 38 and 52 are such and the movement of the intermediate section 46 is so controlled that the straight edge portions G, G' defining opposite edges of the effective aperture O, when the stick is gripped, will be at least as long as the breadth of the wide face F of the stick S. Due to this construction, the edges G, G' will bear against the full breadth of the wide faces F and afford a maximum bearing surface for the stick and a maximum distribution of wear on the apertures. Furthermore, the movement of the intermediate section 46 is so controlled and the shape of the said apertures is such at the time the edges G, G' are spaced apart the thickness of a stick S that the effective opening O has end portions A extending away from both ends of the straight edge portions G, G'. The portions A are narrower than the thickness of the stick S and the distance between said portions is substantially equal to the width of the faces F. In this manner, as the effective opening defined by the registered portions of the three overlying apertures is contracted, the portions A will bear against one or more corners of the narrow edges E of the stick, forcing the stick into an upright position before it is clamped between the edges G, G'.

I have found that one effective shape for the apertures 24, 38 and 52 is that of a rhomboid, as illustrated in the accompanying drawings. It will be understood, however, that any other apertures which cooperate to define an effective aperture O, such as described above, is within the spirit of my invention. If rhomboids are employed, the effective aperture O within which a stick is gripped will have two oppositely disposed straight edge portions G, G' of exactly the breadth of the face F, these straight portions being spaced apart a distance slightly less than the width of the edges E. The portions G, G' perform a gripping function and may be therefore denominated as gripping members or means. Extending away from opposite ends of the straight edge portions G, G' are a pair of triangles A, one edge of each of which constitutes an extension of a straight edge G, G'. The inclined side L of each triangle A runs from the tip of the extension of the straight edge to the end of the opposed straight edge. These inclined edges L during contraction of the effective aperture O coact with the edges E to force the stick into an upright position. Such edges may, therefore, be denominated as locating members or means.

Although I have shown the locating edge of an effective aperture O as acutely meeting the adjacent straight gripping edge of a rhomboidal aperture 24 in the same wall, it will be understood that the rhomboidal apertures may be so constructed and arranged that the locating edge L forms an obtuse angle with the gripping edge G. It will be appreciated that only two adjacent edges of each rhomboidal aperture need perform a gripping or locating function, and that therefore the remaining edges may be of any size, shape or curvature.

By using a locating edge L which cooperates with a narrow edge E of a stick and a gripping edge G which engages a flat face F of a stick, I can accurately grip a stick in vertical position in my multiple stick holder without substantially mutilating the same, and without causing much wear on the gripping edges G. It may be mentioned that the gripping action is performed wholly upon the flat face F of each stick, and that the edges E of the stick are principally used for the purpose of vertically locating said stick although they may also obliquely press against a corner of each of the narrow edges, as shown in Fig. 5.

Suitable means is provided for imparting the desired movement, above described, to the intermediate section 46. Such means may comprise the manual actuating device 18 which is capable of imparting motion in a direction parallel to the longitudinal axis of the box 12.

Due to the standard arrangement of the cavities of an ice-cream mold in such manner that the wide flat faces F of the sticks S are disposed parallel to the longitudinal axis of the box 12, I also provide means for transforming the effective movement of the actuating means so that when the intermediate section 46 is shifted, it will travel in a direction oblique to the wide face F of the sticks S; that is, said intermediate section will have component motions both parallel and normal to the wide stick face F. The parallel component is for vertically arranging the sticks and the normal component is for gripping the sticks.

The actuating means 18 and the translating means may be constructed as follows: A pair of ears 54 are struck up from the top wall 22. Said ears are apertured as at 56 to rotatably receive a shaft 58 which projects beyond both of the ears 54. Mounted on the projecting portions for rotation therewith are bell crank levers 60. The upper ends of said levers are integrally connected to each other by a bar 62 which serves as a handle for the manual actuating means 18. The lower ends of said levers 60 are pivotally interconnected by pins 64 to links 66 which together carry a shaft 68 at their extreme ends. This shaft 68 has portions 70 projecting beyond the links 66. Said portions 70 are received in a pair of openly recessed tongues 72 which are struck up from the wall 50 of the intermediate section and which freely extend through wide apertures 74 in the top wall 22.

In order to maintain the portion 70 in the open indentations of the tongues 72, I keep a strip 71 of metal in resilient engagement with the upper part of the shaft 68. Said strip may be struck away from the wall 22 and is integrally connected to said wall by the leg 73. It will thus be seen that as the handle 62 is oscillated about the shaft 58, the intermediate section will be translated longitudinally of the box 12.

The intermediate section also has a cam block 76 integrally projecting from its upper surface. Said cam block comprises an elongated rectangular portion whose longitudinal edges 78 are disposed parallel to the desired direction of movement M of the intermediate section 46. Cooperating with said cam 76 is a cam 80 integrally depending from the top wall 22. The longitudinal edge 82 of the said cam 80 is oriented in the same direction as the longitudinal edge 78 of the cam 76. A pin 83 which engages the other longitudinal edge 84 of the cam 76 maintains the two camming edges 78 and 82 in permanent engagement.

The holder 10 may be readily disassembled for cleaning by pulling out the bottom section 32. The intermediate section will then drop out of the box. It will be noted that the handle 62 may then be swung to such an extent about the shaft 58 that the shaft 68 will clear the end of the strip 71, whereupon the actuating means may be thoroughly cleansed. Such movement is prevented during the operation of the device by abutment of the tongues 72 against the ends of the apertures 74 before the shaft 68 clears the strip 71.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a device of the character described for removably holding a plurality of sticks having oppositely disposed wide faces, an elongated frame including a pair of overlying spaced gripping members, a third gripping member intermediate said first two gripping members, said gripping members having overlying openings therein with straight edges parallel to the longitudinal axis of said frame, the openings in the pair of gripping members being in registration, and means to move said third gripping member relative to said pair of gripping members in a direction longitudinal and transverse of the frame at the same time so that said straight edges will clamp the wide faces of the sticks therebetween.

2. In a device of the character described for removably holding a plurality of sticks having wide faces and narrow edges, an elongated frame including a pair of overlying spaced gripping members, a third gripping member intermediate said first two gripping members, said gripping members having overlying openings therein with straight edges parallel to the longitudinal axis of said frame, the openings in the pair of gripping members being in registration, and means to move said third gripping member relative to said pair of gripping members in a direction longitudinal and transverse of the frame at the same time so that the ends of the openings in the moving gripping member will engage the narrow edges of the sticks and locate said sticks in predetermined relative arrangement and the straight edges will clamp the wide faces of the sticks therebetween in such arrangement.

3. In a device of the character described for removably holding a plurality of sticks having wide faces and narrow edges, an elongated frame including a pair of overlying spaced gripping members, a third gripping member intermediate said first two gripping members, said gripping members having overlying openings therein of such shape that the overlapping portions thereof define an aperture having two opposed straight parallel edges which are parallel to the longitudinal axis of the frame and are joined by ends, and means to move said third gripping member relative to said pair of gripping members in a direction longitudinal and transverse of the frame at the same time so that the ends of the openings will approach each other to engage the narrow edges of the sticks and locate said sticks in predetermined relative arrangement and said straight edges of the openings will approach each other to clamp the wide faces of the sticks therebetween in such arrangement.

4. In a device of the character described for removably holding in predetermined position an elongated stick having a pair of oppositely disposed narrow edges and oppositely disposed wide faces, the combination of a pair of spaced gripping members, a third gripping member intermediate said first two gripping members, overlying openings in said gripping members, and means to move said third gripping member relative to said pair of gripping members in a direction parallel to said wide faces so that portions of said openings will coact with said narrow edges to arrange said stick in predetermined position, said last named means at the same time moving said third member relative to said pair of gripping members in a direction perpendicular to said wide faces so that the other portions of said openings will flatly clamp said wide faces between them and hold said stick in such predetermined position.

5. A device as set forth in claim 4 wherein the third gripping member moves between two positions in one of which the overlying openings in the three gripping members define an effective aperture larger all around than the transverse cross-section of the stick and in the other of which they define an effective aperture smaller all around than said first named aperture, said second named effective aperture being elongated and having longitudinal edges comprising directly opposed straight portions which are at least as long as the wide faces of the stick and are spaced apart a distance slightly less than the narrow edges of the stick.

6. A device as set forth in claim 4 wherein the third gripping member moves between two positions in one of which the overlying openings in the three gripping members define an effective aperture larger all around than the transverse cross-section of the stick and in the other of which they define an effective aperture smaller all around than said first named aperture, said second named effective aperture being elongated and having longitudinal edges comprising directly opposed straight portions which are spaced apart a distance slightly less than the narrow edges of the stick, wherein the directly opposed straight portions are substantially as long as said wide faces, and wherein the second named effective aperture has end portions narrower than and extending away from the part of said aperture between said opposed straight portions.

7. A device as set forth in claim 4 wherein the third gripping member moves between two positions in one of which the overlying openings in the three gripping members define an effective aperture larger all around than the transverse cross-section of the stick and in the other of which they define an effective aperture smaller all around than said first named aperture, said second named effective aperture being elongated and having longitudinal edges comprising directly opposed straight portions which are at least as long as the wide faces of the stick and are spaced apart a distance slightly less than the narrow edges of the stick, and wherein the second named effective aperture is a rhomboid in which the maximum inscribable rectangle is slightly smaller than the transverse cross-section of the stick.

8. A device as set forth in claim 4 wherein the third gripping member moves between two positions in one of which the overlying openings in the three gripping members define an effective aperture larger all around than the transverse cross-section of the stick and in the other of which they define an effective aperture smaller all around than said first named aperture, said second named effective aperture being elongated and having longitudinal edges comprising directly opposed straight portions which are at least as long as the wide faces of the stick and are spaced apart a distance slightly less than the narrow edges of the stick, and wherein both of the effective apertures are rhomboids and the maximum rectangle inscribable in the second named effective aperture is slightly smaller than the transverse cross-section of the stick.

9. A device as set forth in claim 4 wherein the clamping portions of the openings are linear and parallel to the wide faces of the stick and wherein the stick arranging portions of the openings are disposed angularly relative to said clamping portions.

10. A stick holder comprising a pair of plane gripping members, means to mutually detachably attach said members in spaced parallel relationship, a third plane gripping member slidable between said pair of gripping members in a direction parallel to the planes thereof and held by said pair of members against perpendicular displacement relative thereto, an upstanding member rigidly secured to said third gripping member and extending through an aperture in one of said pair of gripping members, whereby said stick holder can be disassembled by first detaching said pair of gripping members and then moving said third gripping member perpendicular to the gripping member having the aperture therein to withdraw said upstanding member through said aperture and means associated with said upstanding member to move the third gripping member relative to the other two gripping members to grip a stick.

11. A stick holder as set forth in claim 10 wherein the means for moving the third gripping member comprises an actuating handle carried by the gripping member having the aperture therein and means interconnecting said handle and the upstanding member, whereby movement of said handle will slide the third gripping member, said upstanding member and interconnecting means being automatically disengaged upon perpendicular displacement of said third gripping member to withdraw said upstanding member through said aperture.

12. A stick holder comprising a pair of plane gripping members, means to mutually detachably attach said members in spaced parallel relationship, a third plane gripping member slidable between said pair of gripping members in a direction parallel to the planes thereof and riding on the lower gripping member, a pair of spaced upstanding members rigidly secured to said third gripping member and extending freely through a pair of slots in the upper gripping member, a bridging member detachably received in and spanning said upstanding members above the upper gripping member, whereby said stick holder can be disassembled by first detaching said pair of gripping members, removing said lower gripping member and then moving said third gripping member perpendicular to the upper gripping member to withdraw the pair of upstanding members through the slots in the upper gripping member, the attachments between the bridging member and upstanding members being automatically broken upon such displacement of the third gripping member, an elongated strip carried by said upper gripping member and resiliently bearing against the bridging member to hold said bridging member against said upstanding members and to press the third gripping member against the bottom gripping member, an actuating handle carried by the upper gripping member, and means operatively interconnecting said handle and bridging member so that movement of said handle causes sliding of the third gripping member.

LEO D. OVERLAND.